United States Patent [19]

Faulkner et al.

[11] 4,326,645
[45] Apr. 27, 1982

[54] WEIGHING AND DISPENSING UNIT

[76] Inventors: Keith Faulkner, 24, Parkhill Rd., Bexley, Kent, England; David E. Appleford, 7 Ayr Green, Rise Park, Romford, Essex, England

[21] Appl. No.: 119,301

[22] Filed: Feb. 7, 1980

[51] Int. Cl.³ ............................................. G01G 13/00
[52] U.S. Cl. ......................................... 222/1; 99/348; 222/77; 222/226; 222/106
[58] Field of Search .......... 222/1, 77, 146 H, 146 HE, 222/108, 196, 200, 226, 227, 217, 247–248, 243; 99/348; 177/64, 106, 111

[56] References Cited
U.S. PATENT DOCUMENTS 1,551,810  9/1925  Draver ................................ 222/200
2,151,107  3/1939  Howard ............................... 177/103
4,171,067 10/1979  Faulkner et al. ..................... 222/36

FOREIGN PATENT DOCUMENTS

885294 12/1961 United Kingdom ............... 177/106

Primary Examiner—H. Grant Skaggs
Attorney, Agent, or Firm—Roylance, Abrams, Berdo & Farley

[57] ABSTRACT

A load of solid food products such as fried potato chips and french fries are supplied to a receptacle opening into a dispensing chamber in which a releasable weighing platform is disposed. In order to facilitate flow of food products within the load and above a bottom wall of the receptacle, an agitator member having elongate parallel spaced-apart side elements joined by an end element adjacent a rear wall of the receptacle remote from the chamber opening is constrained to move upwards and downwards and towards and away from the chamber opening to exert a supporting and lifting action on the load of food products above said agitator member. When a predetermined weight of food products is reached, the weighing platform hinges downwardly to dispense a weighed portion of food products.

17 Claims, 6 Drawing Figures

WEIGHING AND DISPENSING UNIT

BACKGROUND OF THE INVENTION

1. Field of the Invention

This invention relates to a unit for weighing and dispensing portions of food such as potato products and in particular hot, fried, potato chips and french fries, and has for its object improvements therein.

2. Description of the prior art

In the specification of our U.S. Pat. No. 417,067 there is described a unit for weighing and dispensing portions of hot, fried, potato products comprising a casing in which are disclosed a receptacle for receiving a supply of the potato products and a dispensing chamber opening into said receptacle and into which hot potato products are fed by a vibrator unit coupled to a bottom wall of the receptacle, a heating element for maintaining chips hot whilst in the receptacle and in the dispensing chamber, the bottom wall of the receptacle being inclined upwardly in the direction of the dispensing chamber for allowing hot frying oil or fat to drain away in the opposite direction and into a collector, a weighing platform disposed inside the dispensing chamber and being hinged to a movable weighing support disposed outside the dispensing chamber, the weighing platform being retained in a position to receive the hot potato products and being released to permit it to hinge downwardly and dicharge the hot potato products therefrom in response to a predetermined amount of movement of the weighing support.

For convenience, potato product such as chips and french fries will be generically referred to as "chips" throughout the main body of this specification.

The Applicants have found with weighing and dispensing units constructed as described above that, in certain instances, in particular when the chip-receiving receptacle is filled to full capacity, there is a tendancy for chips to stick together within the mass of chips in the receptacle which may result in a number of stuck together chips being fed into the dispensing chamber and onto the weighing platform and a weight of chips being dispensed which is greater than the weight to which the weighing means has been set.

SUMMARY OF THE INVENTION

Accordingly, from one aspect, the present invention consists in a unit for weighing and dispensing portions of hot, fried, potato chips, from a supply of such chips, said unit comprising a receptacle, a dispensing chamber opening into said receptacle, weighing means including a weighing platform disposed in said dispensing chamber, and hinged to a movable weighing support, and vibrator means coupled to a bottom wall of the receptacle for feeding hot chips from the receptacle, into the dispensing chamber and onto the weighing platform, characterized in that means are provided for agitating said chips whilst in said receptacle.

The agitating means act to separate and break up bodies of stuck-together chips within the mass of chips in the receptacle and thereby tend to avoid over-riding of the weighing means and delivering of portions of chips which are greater than the preset weight.

Preferably, the agitating means comprises an open-frame like member which extends from the region of the inlet of the dispensing chamber towards the rear wall of the receptacle and which is driven such that it moves upwards and downwards with respect to the receptacle and towards and away from the dispensing chamber inlet. Conveniently, also, the end of the agitating means which is nearer that wall of the receptacle which is remote from the chamber inlet, has a slider, skid or shoe or a rotatable wheel thereon which engages and rides along the said wall of the receptacle which is inclined upwardly and outwardly to accommodate the forwards and backwards movement of the agitating means.

Such a construction permits separating of the stuck-together chips whilst, at the same time, due to the forwards and backwards movement of the agitating means, avoids crushing or damaging the chips against one another or against the receptacle walls during downward movement of the agitating means.

The agitating means may be of polygonal form, for example rectangular or five sided with two long sides extending lengthwise of the receptacle and joined at one of their ends adjacent the receptacle wall which is remote from the dispensing chamber inlet by a generally triangular portion and at their other ends, nearer the chamber inlet by a substantially straight portion, with the long sides optionally converging in the direction away from the chamber inlet.

In order further to enhance the effectiveness of the agitating means, the frame thereof preferably has an arm depending therefrom adjacent and extending in the direction away from the chamber inlet.

In order to drive the agitating means, it is connected to a spindle driven through an appropriate linkage by means of an electrical motor housed within the unit.

In a further preferred embodiment of this aspect of the invention, the agitating frame is connected to the spindle by means of a plate which is fixed to the spindle at its upper end and which pivots about the spindle axis in the direction towards and away from the chamber inlet. The plate acts as a fine levelling device so that the chips being fed into the chamber inlet which have already been separated by the agitating means are separated still further into substantially a single tier layer of chips which are thereby fed in a controlled sprinkle onto the weighing platform. In most instances, the agitating means is sufficient by itself to provide a controlled sprinkle type feed but the inclusion of the fine levelling action of the plate is desirable in order to obtain optimum feed control.

In the specification of our aforesaid application, there is described an embodiment in which a shutter member is movable in response to releasing the weighing platform, through a gap between the receptacle bottom wall and the wall of the dispensing chamber into a position in which it projects above the weighing platform to prevent further chips being dispensed after release of the weighing platform. Applicants have found that there is a tendency for chip bits and hot frying oil or fat to collect on the shutter member and eventually make into the interior of the unit. Since the unit is provided with a heating element in order to keep the supply of chips in the receptacle hot, such chip bits and frying oil or fat could, conceivably, constitute a fire hazzard. In order to overcome this problem, and from a further aspect of the invention, in a unit comprising a shutter member as described, the gap between the receptacle bottom wall and chamber wall leads directly into a collector for collecting oil or fat drained from the receptacle. Between the gap and the collector, there is a closed path so that the chip bits and oil or fat entering into the unit via the shutter member no longer collect in a position in which cleaning is required in order to avoid fire hazzard.

Preferably, the enclosed path is defined by casing or cover members or plates which protect the drive for the shutter member and also an electrical motor for driving the agitator means.

Preferably, the drive means for the shutter member is mounted on one of such casing members and is conveniently a solenoid, either D.C. or A.C.; the armature of the solenoid is connected directly to the shutter member.

In order to simplify the weighing means and to provide for a wider range of weight adjustments for dispensed chip portions, and in accordance with yet another aspect of the invention, the unit comprises a weighing support which is mounted for vertical linear movement through a beam which in turn supports the weighing support on a knife edge, the weighing beam having a counter weight which is adjustable therealong. The weighing support is further supported on an adjustable stop member for setting the portion weight and to finely adjust the portion weight the counterweight can be moved to suit a scale on the outside of the unit.

The invention also consists in a method of weighing and dispensing portions of hot, fried, potato chips from a supply of chips in a receptacle which comprises feeding the chips onto a hinged weighing platform, in a dispensing chamber and weighing the chips on the weighing platform such that the weighing platform hinges downwardly when a predetermined weight is reached to dispense the chips from the dispensing chamber, characterized by agitating the chips in said receptacle.

Preferably, the chips are levelled prior to feeding them onto the weighing platform.

BRIEF DESCRIPTION OF THE DRAWINGS

In order that the invention may be more fully understood, an embodiment thereof will now be described, by way of example, with reference to the accompanying drawings, in which.

DESCRIPTION OF THE PREFERRED EMBODIMENT

The unit shown in the drawings comprises a casing 1 which is of generally rectangular shape in plan and is shown as being bolted to a stand 2 which is only partially shown. Disposed in the open top of the casing 1 is a chip receptacle 3 having a rear wall 4 which slopes upwardly and outwardly from the separate bottom wall 5 constituting a vibration tray which slopes downwardly in the direction away from the inlet of a dispensing chamber 6.

There is a gap between the sloping rear wall 4 of the receptacle and the separate vibration tray 5 which enables hot frying oil or fat to drain through a spout 7 depending from the vibration tray, a funnel 8 and into a collector container 9 resting on the bottom of the casing 1 and removable therefrom through a hinged flap 10 on the front of the casing.

Mounted in the space between the vibration tray 5 and oil collector 9 and bolted to a transverse plate 11 is a commercial vibrator unit 12 with its coupling member 13 in engagement with the underneath of, and supporting, the vibrator tray 5. The back of the casing has secured thereto the column 14 of an electrical, infrared, heating unit 15 disposed above the receptacle for keeping hot fried chips deposited in the receptacle. The column comprises the plug part of a plug and socket connector 16 of which the plug plugs into the socket when the column is bolted to the casing, the connector constituting a safety connection which is disconnected when the column is unbolted for transport purposes. The socket part of the connector is connected to the control circuitry generally indicated at 17 and which is protected by a cover plate 18 from any hot oil or fat which may enter the space between the funnel 8 and the rear wall of the casing. The top wall of the cover plate 18 is inclined downwardly in the direction of the funnel 8 and there is an opening between the rear end 19 of the transverse plate 11 for the drainage of over-spilled oil or fat into the collector 9.

Mounted in the casing forwardly of the dispensing chamber 6 is weighing means constituted by a weighing mechanism which comprises a weighing frame 20 which is disposed outside the dispensing chamber and to which is hinged a weighing platform 21 by sprung loaded hinge pins 22 which enable the weighing platform to be easily removed for cleaning purposes. The weighing platform is disposed just beneath the chamber inlet and occupies a substantially horizontal chip receiving position and is releasable into a substantially vertical position to dispense chips out of the dispensing chamber via a dispensing funnel 23 which terminates in a chamber outlet. The rear wall of the dispensing chamber 6 separates the space containing the vibrator unit 12 from the path taken by the weighed portion of the chips as it is dispensed through the funnel 23 upon release of the weighing platform.

The weighing frame 20 is similar to that described in our aforementioned U.S. Pat. No. 4,171,063 the subject matter of which is incorporated into the present application by reference. The weighing frame 20 is supported by means of a spring loaded arm 24 on a stop 25 which is adjustable from outside the casing to vary the weight of the chip portions being dispensed, the stop being of cotton-reel configuration with the arm being supported in the groove between the reel flanges to prevent angular movements of the frame. The weighing platform is retained in a substantially horizontal chip-receiving position by means of a latch member 26 pivotally mounted on a needle bearing 27 fixed to the weighing frame so that as the weighing platform is depressed by the weight of the chips on the platform the weighing frame moves vertically downwards until the releasing point determined by the position of the adjustable stop 25 is reached whereupon the weighing platform is released and hinges downwardly to dispense a weighed portion of chips. The weighing platform is reset by means of an external handle 28 connected to a lever 28a which cooperates with a lever 28b connected to the weighing frame 20.

The cotton-reel configuration of the stop 25 obviates the necessity for vertical guide slots for the weighing frame in the wall of the dispensing chamber.

The weighing frame is supported in a counter-balanced manner through a wire 29 and beam 30 carrying a counter-weight 31 on a knife edge 32. The counter-weight is adjustable along the length of the beam 30 to finely adjust the portion weight set by the stop 25. The top of the dispensing chamber 6 is covered by a grill 33 which allows the direct entry of heat to the dispensing chamber to keep it hot, thereby increasing the amount of heat supplied to the dispensing chamber beyond that which would otherwise be transmitted by conduction through the casing.

Figure 1:
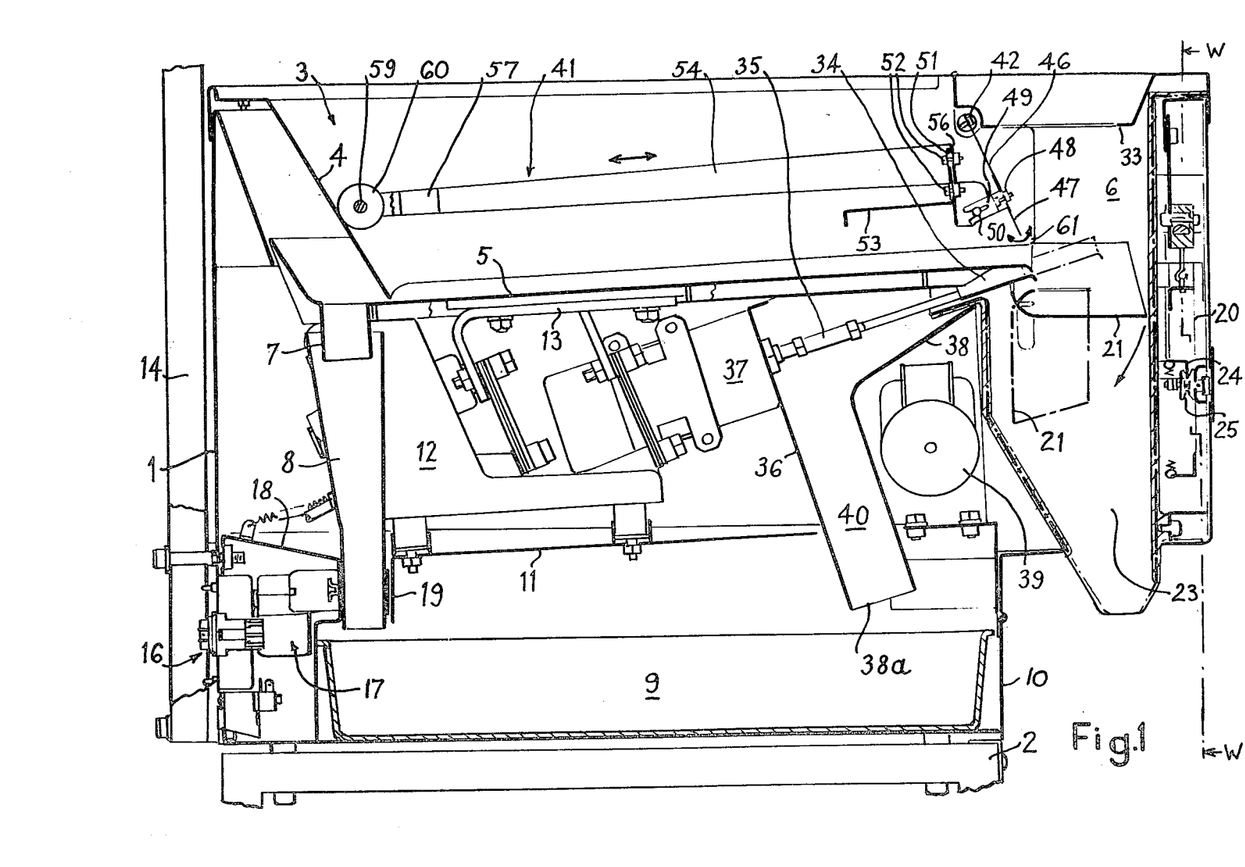
FIG. 1 is a part-sectional side elevation of a chip weighing and dispensing unit constructed in accordance with the invention.
Figure 2:
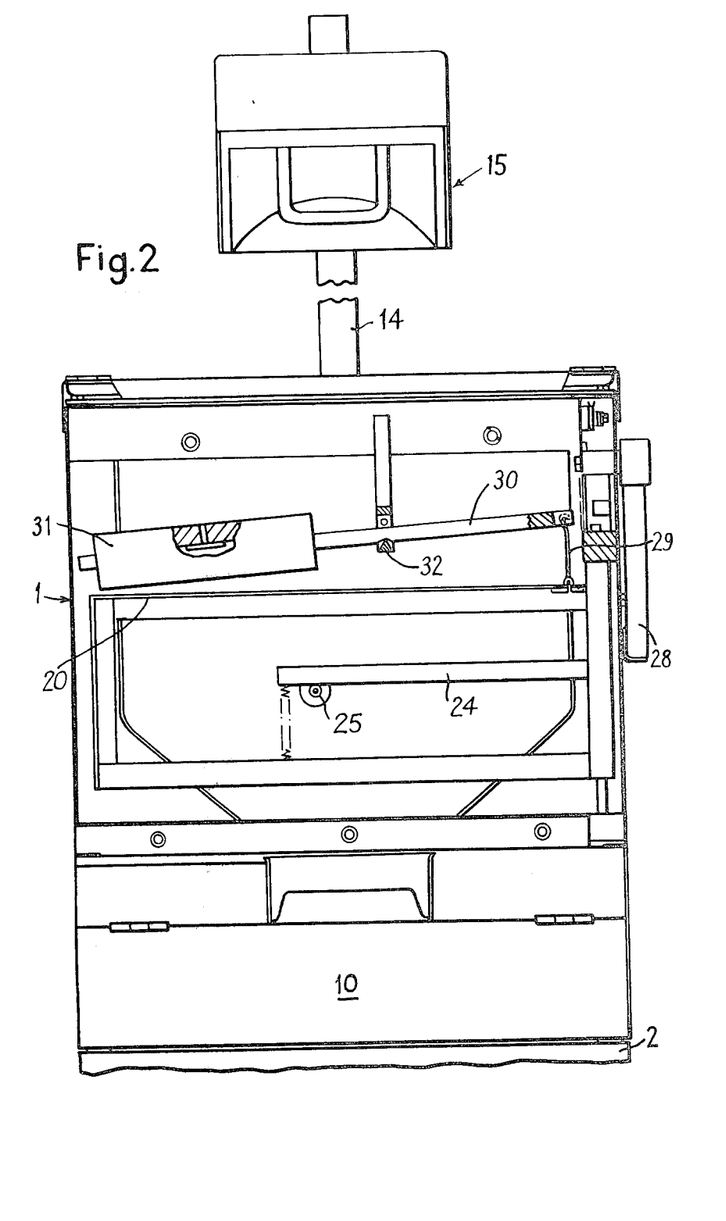
FIG. 2 is a vertical section taken along the line W—W of FIG. 1.
Figure 3:
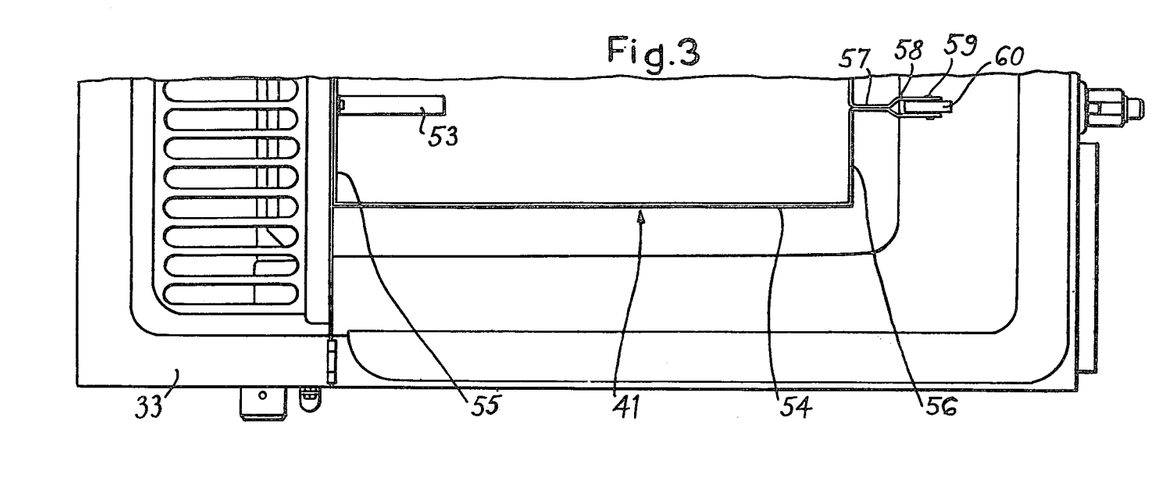
FIG. 3 is a part plan view of the unit.
Figure 4:
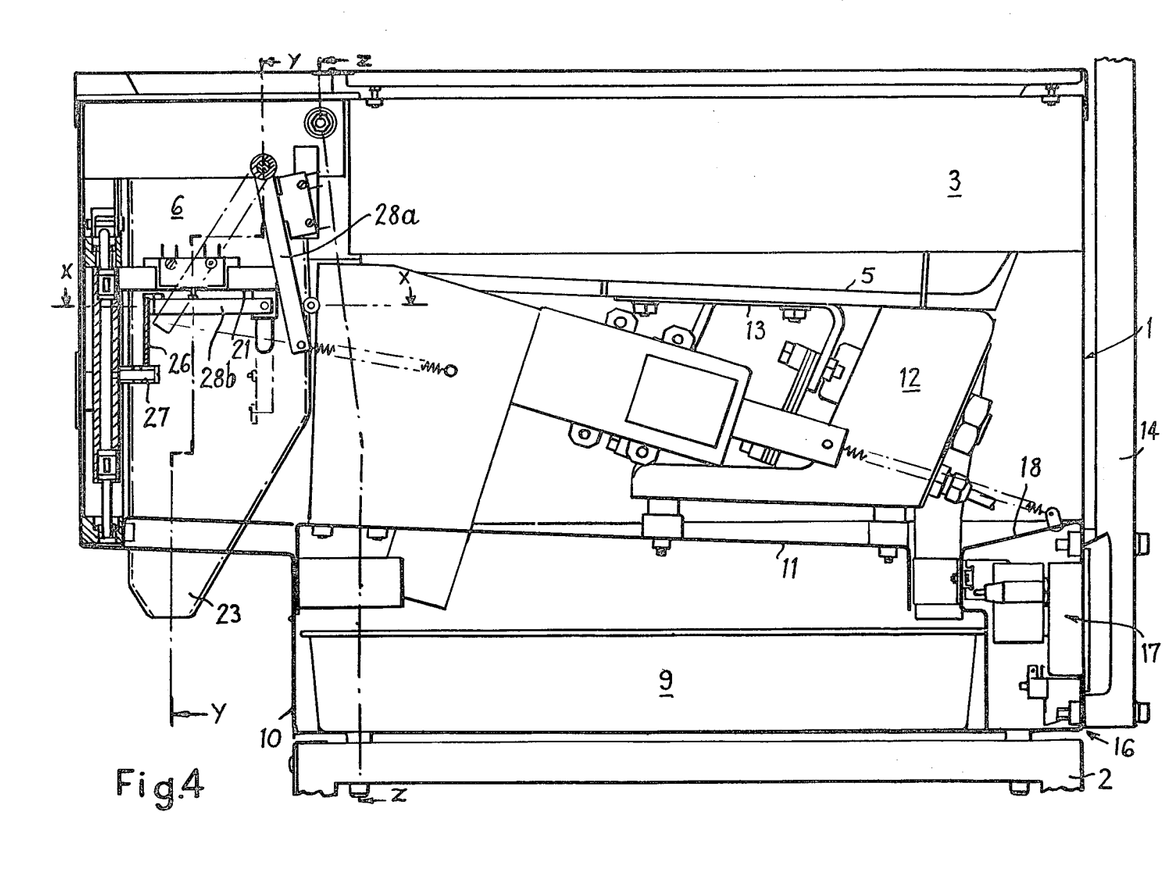
FIG. 4 is a longitudinal section taken along the line V—V of FIG. 5.
Figure 5:
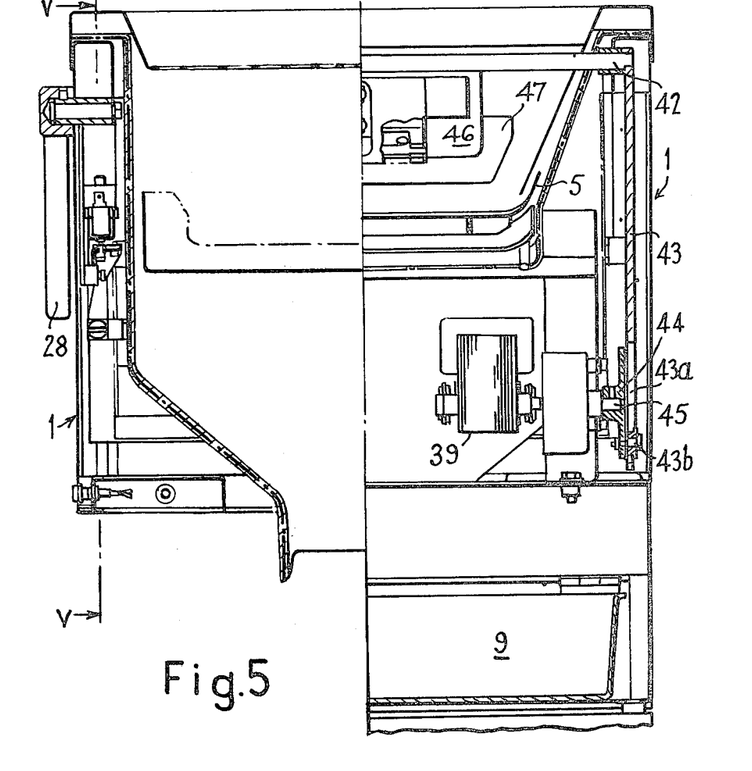
FIG. 5 is an opposite cross-sectional view of which the left-hand half section is taken along the line Y—Y of FIG. 4 and the right-hand half section is taken along the line Z—Z of FIG. 4.
Figure 6:
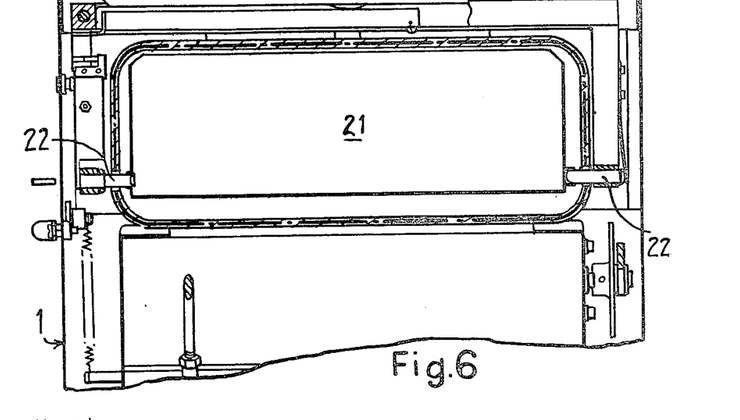
FIG. 6 is a scrap section taken along the line X—X of FIG. 4.

In order to prevent the possibility of further chips from being fed into the dispensing chamber and falling into the funnel 23 after release of the weighing platform 21, a solenoid-operated shutter 34 is provided. The shutter 34 is fixed directly to the solenoid armature 35 which passes through an aperture in a protective plate 36 through which the solenoid 37 which is preferably a D.C. operated solenoid is bolted so that it lies within the space containing the vibrator 12. A further protective plate 38 fixed to side walls 38a (only one shown) of plate 36 covers an electric motor 39 for driving agitating and levelling means to be described. The motor 39 is bolted to the plate 38 which defines with plate 36 and side walls 38a a channel 40 which extends through an aperture in the transverse plate 11 and into the space above the oil collector 9. Thus, any chip bits or oil which are transferred by the shutter as it moves from its gating position shown in dotted lines in FIG. 1 where it projects above the weighing platform to its non gating position shown in full lines in FIG. 1, into the space between the transverse plate and the vibrator tray 5, are drained away through the channel 40 keeping the space containing the vibrator, the solenoid and the drive motor for the agitating means free from the chip bits and oil or fat.

The agitating and levelling means referred to previously herein will now be described. In order to prevent portions of chips being dispensed which are greater than the preselected weight determined by the adjustable stop 25, caused by bodies of stuck-together chips being fed onto the weighing platform, the chips in the receptacle 3 are agitated by means of an agitator 41 in the form of an open frame-like structure supported in the receptacle from an angularly movable spindle 42 journalled in bearings between the side panels of the casing 1 in a position above and rearwards of the dispensing chamber inlet. The spindle is moved angularly over a range for example of about 10 to 20 degrees by means of an arm 43 fixed to one of the ends of the spindle at its upper end and at its lower end having a slot 43a therein. Slidably mounted in the slot 43 is a bearing block 43b which is preferably of Nylon which is bolted eccentrically to a drive disc 44 fixed to the output shaft 45 of the drive motor 39. Fixed to a flat on the drive spindle 42 is a plate 46 which extends transversely between the side walls of the receptacle and a levelling plate 47 is adjustably secured to the mounting plate 46 by screws 48 passing through holes in the mounting plate and slots in the levelling plate. The agitator 41 is supported by a bearing member in the form of generally U-shaped clip 49 which is secured to the levelling plate 47 by the screws 48. The clip arms of the U-shaped clip pivotally engage with a bearing rod 50 fixed between the arms of a bracket 51 which, in turn, is fixed to the front end portion of the agitator 41. The clip 49 is conveniently of a plastics material, for example Delrin, Nylon or P.T.F.E. so as to provide a substantially frictionless bearing surface for the pivot rod 50. Projecting rearwardly from the bracket 51 and secured thereto by screws 52 is a breaker or separating member or arm 53 which facilitates the separation of stuck-together bodies of chips which have not been fully broken up or separated by the agitator frame 41. The separating member is constructed with a blunt rearwardly projecting end so that chips will not be pierced by and collect on the separating member by bending the rear end downwardly. Alternatively, the rear end of the separating member could be of mushroom-like shape or otherwise rounded.

The agitator frame 41 is of rectangular form having its long sides 54 extending lengthwise of the rectangle and joined by short ends 55 and 56 with front end 55 being fixed to the bracket 51. A straight portion 57 connects the rear end 56 with a generally U-shaped mounting portion 58 carrying a spindle 59 on which a wheel 60 which is conveniently of a plastics material such as Delrin can rotate freely. As will be apparent from the drawings, the agitator frame is made from a single strip of material which is bent into the required shape and secured as by spot welding at the interconnecting straight portion 57. The separating member 53 is also made of a strip of suitable material.

As the drive spindle 42 is angularly moved by the drive motor 39 and interconnecting linkage, the levelling plate 47 is pivoted backwards and forwards about the axis of the spindle in the direction given by the arrow heads 61. The pivotal movement of the levelling plate 47 transmits, via the mounting clip 49 and bracket 51 a composite movement to the agitator 41, a composite movement which is also caused by the movement of the wheel 60 along the outwardly inclined rear wall 4 of the receptacle 3. Thus, the agitator frame 41 moves backwards and fowards in the direction towards and away from the chamber inlet and also upwards and downwards as the rearwards and forwards movements respectively take place. The movement of the agitator frame is followed by that of the separating member 53. Thus it can be seen that the agitator frame and breaker member will move within the mass of chips in the receptacle causing a separating movement of any stuck-together bodies of chips and should any stuck-together bodies of chips come near to the chamber inlet the separation action will be completed by the breaker member. The slope of the rear wall of the receptacle is matched to the pivotal movement of the levelling plate and spindle. Should the agitator frame be pushed upwards so that the wheel disengages the rear wall of the receptacle, because of the backwards and forwards movement of the agitator frame, as the wheel moves downwards in the direction to engage the rear wall the chips will not be squashed, crushed or damaged. The agitator frame is particularly useful for separating and breaking up stuck-together chips when the chip receptacle is filled to capacity. The levelling plate, the height of which is adjustable as desired to control the feed of chips provides a fine adjustment of the feed. Indeed, in certain instances, the agitator without the levelling may be all that is required to provide a controlled feed in which the chips are sprinkle-fed onto the weighing platform.

Another important advantage of the agitator is that its construction permits it to occupy a minimal volume in the chip receptacle so that, in effect, the volume of chips which the receptacle can hold is not altered by the presence of the agitator. Furthermore, the agitator allows the vibrator 12 to operate correctly so that the chips are fed through the chamber inlet in substantially a single tier of chips. In the vibrator tray illustrated in the drawings the sides and rear end are upwardly turned, the front end being downwardly turned to prevent hot oil or fat running back underneath the vibrator tray.

The control circuitry and switching of the described unit takes place in a similar manner to that of the aforesaid patent application and the drive motor for the agitator and levelling means is connected in parallel with the vibrator and operates immediately the vibrator is switched on.

It will be appreciated that various modifications may be made without departing from the invention.

For example, the form of the agitator may be varied. Means may be provided for controlling the movement of the agitator, for example its speed, its rhythm and the control means may stop the movement of the agitator for a certain period. The control means may be incorporated in the agitator drive motor to which end the motor may be of variable speed and/or provided with a brake or be a stepping motor. Alternatively the motor may be controlled by a suitable electronic circuit in which case the motor is preferably a D.C. motor.

We claim:

1. A unit for weighing and dispensing portions of fried potato products, from a supply of such products, said unit comprising a receptacle for receiving said supply, said receptacle having a bottom wall and a sloping rear wall which is inclined upwardly and outwardly away from the bottom wall of the receptacle, a dispensing chamber opening into said receptacle, weighing means including a releasable weighing platform hinged to a movable weighing support, vibrator means coupled to a bottom wall of said receptacle for feeding potato products from the receptacle, into the dispensing chamber and onto the weighing platform, an agitator for use in agitating the potato products whilst in the receptacle, means supporting the agitator in the receptacle in a position which is spaced from the bottom wall thereof, drive means for moving the agitator, including a drive spindle, means mounting said spindle for angular movement about a substantially horizontal axis and means connecting said spindle to said agitator, said agitator being provided with a member which engages with and moves up and down the said rear wall during movement of said agitator, the slope of said rear wall being matched to the angular movement of the spindle, said connecting means and said rear wall slope translating the angular movement of the spindle into reciprocating movement of the agitator in directions upwards and downwards and towards and away from the chamber opening.

2. A unit as claimed in claim 1, wherein said agitator is in the form of an open frame.

3. A unit as claimed in claim 2, wherein the frame is of rectangular configuration and extends in the direction away from the dispensing chamber opening.

4. A unit as claimed in claim 1, further comprising a member for use in separating potato products in the receptacle and connected to said agitator at a location adjacent the dispensing chamber opening, the separating member extending beneath said agitator in the direction away from the chamber opening and terminating in a blunt free end.

5. A unit as claimed in claim 1, wherein said drive means includes an arm which is fixed at its upper end to said spindle, means defining a slot in the lower end portion of said arm, a bearing member slidably mounted in said slot, means connecting said bearing member eccentrically to a drive disc, and an electric motor having an output shaft to which said drive disc is secured for rotation therewith.

6. A unit as claimed in claim 1, further comprising means extending across the chamber opening for levelling out the potato products as they are fed towards the dispensing chamber, said levelling means being driven by the drive means for said agitator.

7. A unit as claimed in claim 6, wherein said levelling means comprises a plate having a free edge which is spaced from the bottom wall of the receptacle leaving a gap therebetween and which is rigid with said spindle whereby the movement of the free edge of the plate follows an arcuate path, and wherein means are provided for adjusting the width of the gap between the free edge of said plate and the receptacle bottom wall.

8. A unit as claimed in claim 7, wherein said connecting means includes a first bearing member which is fixed to the levelling plate and a co-operating bearing member fixed to the agitator, whereby the co-operating bearing member is moved angularly about a substantially horizontal axis, the unit further comprising, means for controlling said agitator, a shutter member responsive to the release of the weighing platform to move through a gap defined between the bottom wall of the receptacle and a wall of the dispensing chamber into a position above the weighing platform to prevent any further potato products from being dispensed, said gap being in communication with a channel which defines a closed path between said gap at one end of the channel and an opening at the other end of the channel which is disposed above a collector; electrical heating means for keeping hot the supply of potato products in said receptacle, said heating means including a heating element disposed above the receptacle, and a grill covering the top of the dispensing chamber and which allows direct access of heat from the heating element to the dispensing chamber, and wherein the weighing support is mounted for vertical linear movement and is supported by means of a resiliently biassed arm on a grooved adjustable stop with the arm engaging in the groove in the stop and in that the weighing support is suspended in a counterbalanced manner by a beam supported on a knife edge and carrying a counter weight which is movable therealong.

9. A unit as claimed in claim 1, wherein said member which engages with and moves up and down said sloping rear wall is a freely rotatable wheel, and wherein means is provided for mounting said wheel on said agitator.

10. A method of weighing and dispensing portions of solid food products, which method comprises, supplying a load of solid food products to a receptacle having a bottom wall, oppositely facing side walls and a rear wall, vibrating said receptacle bottom wall to feed food products onto a hinged weighing platform disposed in a dispensing chamber opening into said receptacle, mechanically moving an agitator member disposed above said bottom wall and spaced from said side walls and having elongate spaced apart parallel sides extending generally in the direction of said bottom wall and towards said rear wall and being joined by an end element adjacent said rear wall and remote from the chamber opening, within the load of food products in said receptacle in the directions of upwards and downwards, and towards and away from said chamber opening to exert a supporting and lifting action on the load of food products above said agitator member, whereby to feed food products on said bottom wall below said agitator member to said dispensing chamber and to facilitate flow of food products from the load of chips towards the bottom wall, levelling the food products being fed as they pass from the receptacle into said dispensing chamber, and weighing the food products on the weighing platform such that the weighing platform hinges downwardly when a predetermined weight is reached to dispense a weighed portion of food products from the dispensing chamber.

11. A unit for weighing and dispensing portions of solid food products from a load of such products, said unit comprising a receptacle for receiving said load, said receptacle having a bottom wall, oppositely facing side walls and a rear wall, a dispensing chamber opening into said receptacle opposite said rear wall, weighing means including a releasable weighing platform hinged to a movable weighing support, vibrator means coupled to said bottom wall of said receptacle for feeding food products from said receptacle, into said dispensing chamber and onto said weighing platform, an agitator member disposed in said receptacle above, and spaced from, said bottom wall, said agitator member having elongate spaced apart parallel side elements extending generally in the direction of said bottom wall of said receptacle and towards said rear wall and being joined by an end element adjacent said rear wall and remote from the chamber opening, levelling means having a bottom edge spaced from said receptacle bottom wall and extending transversely of said chamber opening, means removably connecting said agitator member to said levelling means, means for driving said levelling means and thus said agitator member, means for constraining movement of said agitator member in directions upwards and downwards, and towards and away from said chamber opening whereby to exert a lifting and supporting action on food products above said agitator member whereby food products on said bottom wall below said agitator member are fed into said dispensing chamber and a flow of food products from the load of chips towards said bottom wall is facilitated.

12. A unit as claimed in claim 11, wherein said constraining means comprises a slope in said rear wall which is inclined upwardly and outwardly from said bottom wall, a member which projects from said rear end element of said agitator member and which engages with and moves up and down said slope during movement of said agitator member, a spindle which forms part of said drive means, said spindle being rigid with said levelling means and being mounted for angular movement about a substantially horizontal axis, which angular movement is matched to the inclination of said slope, and bearing means removably connecting said agitator member to said levelling means adjacent said chamber opening for allowing relative upward and downward movement between said agitator member and said levelling means.

13. A unit as claimed in claim 12, wherein said bearing means comprises rod means and generally U-shaped, in cross-section, clip means, the rod means removably engaging in the clip means.

14. A unit as claimed in claim 12, wherein said member which engages with and moves up and down said slope is a freely rotatable wheel and wherein means is provided for mounting said wheel on said agitator member.

15. A unit as claimed in claim 11, wherein said means removably connecting said agitator member to said levelling means comprises bearing elements carried respectively by said agitator member and said levelling means, one of said bearing elements comprising clip means and the other of said bearing elements comprising a rod which extends transversely of said receptacle and which engages in said clip means.

16. A unit as claimed in claim 11, wherein the side elements of said agitator member are joined by another end element adjacent said chamber opening whereby providing an agitator member of generally rectangular configuration, said side and end elements being made of a strip of material having its narrowest dimensions disposed one above the other.

17. A unit as claimed in claim 11 and further comprising a separator member for use in separating the food products from one another, said separator member being fixed rigidly to said agitator member at a location which is nearer the chamber opening than the rear wall of the receptacle, said separator member projecting away from the chamber opening and presenting a blunt surface to food products beneath the agitator member.

* * * * *